US009215309B2

(12) United States Patent
Peterson

(10) Patent No.: US 9,215,309 B2
(45) Date of Patent: Dec. 15, 2015

(54) SYSTEMS AND METHODS FOR CONTROLLING PERSONAL COMMUNICATIONS

(71) Applicant: Maci Peterson, Oak Park, IL (US)

(72) Inventor: Maci Peterson, Oak Park, IL (US)

(*) Notice: Subject to any disclaimer, the term of this patent is extended or adjusted under 35 U.S.C. 154(b) by 0 days.

(21) Appl. No.: 14/641,254

(22) Filed: Mar. 6, 2015

(65) Prior Publication Data
US 2015/0256666 A1 Sep. 10, 2015

Related U.S. Application Data

(60) Provisional application No. 61/949,643, filed on Mar. 7, 2014, provisional application No. 62/096,409, filed on Dec. 23, 2014.

(51) Int. Cl.
| H04M 1/725 | (2006.01) |
| H04W 4/12 | (2009.01) |
| H04W 4/14 | (2009.01) |
| H04W 8/18 | (2009.01) |

(52) U.S. Cl.
CPC ............ *H04M 1/72552* (2013.01); *H04W 4/12* (2013.01); *H04W 4/14* (2013.01); *H04W 8/183* (2013.01)

(58) Field of Classification Search
CPC ......... H04W 4/12; H04W 4/14; H04W 8/183; H04M 1/72552
USPC .............................................. 455/412.1, 466
See application file for complete search history.

(56) References Cited

U.S. PATENT DOCUMENTS

| 6,999,566 | B1* | 2/2006 | Eason ............... H04M 3/53366 379/88.12 |
| 8,041,344 | B1* | 10/2011 | Coughlan ............. H04L 12/585 455/414.1 |
| 8,625,753 | B1* | 1/2014 | Peden ........................ 379/88.22 |
| 9,014,343 | B1* | 4/2015 | Peden ................... H04M 3/533 379/67.1 |
| 2005/0124360 | A1* | 6/2005 | Choi ....................... H04W 4/14 455/466 |
| 2006/0063541 | A1* | 3/2006 | Ryu ................... H04M 3/42382 455/466 |
| 2007/0083601 | A1* | 4/2007 | Kim ..................... H04L 12/5895 709/206 |
| 2009/0228558 | A1* | 9/2009 | Brenner ............... G06Q 10/107 709/206 |
| 2009/0280845 | A1* | 11/2009 | Kim ................... H04M 1/72547 455/466 |
| 2010/0153284 | A1 | 6/2010 | Hoag et al. |
| 2010/0304766 | A1* | 12/2010 | Goyal ..................... H04L 51/34 455/466 |

OTHER PUBLICATIONS

International Search Report and Written Opinion, PCTUS2015/019319, mailed Jul. 2, 2015.

* cited by examiner

*Primary Examiner* — George Eng
*Assistant Examiner* — Marcus Hammonds
(74) *Attorney, Agent, or Firm* — Winston & Strawn LLP

(57) ABSTRACT

A method for using a mobile software application for deleting or recalling unwanted messages on a mobile device before it is delivered to the intended recipient is provided. The software application operates by running on top of the resident messaging application on the mobile device. For example, the application caches the message for specified amount of time and thereby sets a length of delay. The user has the application on the mobile device and the message is composed on the OST application and the application software keeps the message in a buffer for a predetermined amount of time after the user selects to send the message such that if the user regrets sending the message, it can be deleted or recalled before the message leaves the mobile device. Other advantages that are understood from the present disclosure will further be apparent.

18 Claims, 15 Drawing Sheets

SYSTEMS AND METHODS FOR CONTROLLING PERSONAL COMMUNICATIONS

CROSS REFERENCES TO RELATED APPLICATIONS

This application claims the benefit of U.S. Provisional Application No. 61/949,643, filed on Mar. 7, 2014 and U.S. Provisional Application No. 62/096,409, filed on Dec. 23, 2014, the disclosures of which are expressly incorporated herein by reference thereto.

TECHNICAL FIELD

The embodiments of the present invention generally relate to a method of a wireless messaging application such as SMS and MMS used on mobile devices, and more particularly, to a method that allows the user to initiate a delete or recall command of an unwanted message before it is finally delivered to the intended recipient.

BACKGROUND OF THE INVENTION

Short Message Service (SMS) is a standardized communication service typically used in mobile communication systems but may also be used in non-mobile communication devices. Using standardized communications protocols, SMS allows for the interchange of short text messages between communication devices. SMS text messaging has become the most widely used data application on the planet with 2.4 billion active users, or 74% of all mobile phone subscribers sending and receiving text messages on their communication devices.

As another example of some of the enhancements introduced to basic SMS service, Multimedia Messaging Service (MMS) is a telecommunications standard for sending SMS messages which include multimedia objects (images, audio, video, rich text). MMS is an extension of the SMS standard, allowing for longer message lengths. In addition, MMS may utilize Wireless Application Protocols (WAP) to display the content. MMS' most popular use is found in the sending of photographs from camera-equipped handsets, although it is also popular as a method of delivering ringtones as well.

With over half of U.S. mobile consumers owning mobile devices such as i-phones and smart-phones and the like, the advent of media-rich technologies on mobile devices enable sense of liberation for users of such devices, yet such users continue to face inherent problems. Research has shown that smartphone users at the age of 18-24 send an average of 2,002 text messages and receive an additional 1,831 text messages per month. Text-based communications such as, for example, texting, e-mail, instant messaging, and text-based social media (e.g. Facebook™) and/or micro-blogging (e.g. Twitter™), has become an increasingly popular form of human interaction with the advancement of social media. Though these ever evolving media technologies have increased human interaction and communication, they do not come without their inherent drawbacks and disadvantages. Oftentimes people send messages that either may have significant amount of typos, mistakes and the like, or they later regret for one reason or another that they wished the message could be recalled or deleted somehow. Currently there exists no mobile software application in the market that lets a user to undo a created message just after it has been sent, but before it is delivered to the recipient. As such, there is a need in the prior art for software applications installed on mobile devices that can fulfill this role. Preferably, the mobile software application installed on the mobile device would be able to delete, or recall an unwanted message, before the message is delivered to the intended recipient.

Thus in view of the above, given the lack of existence and implementation of mobile software applications that allow seamless deletion or recalling of regrettable and unwanted messages reaching the intended recipient, there is still an unmet need in the prior art for such software mobile applications. As such, the presently disclosed embodiments of the invention now provide such solutions, and provide other advantages that are understood from the present disclosure.

SUMMARY OF THE INVENTION

In a preferred embodiment of the invention, a method for using a mobile application entitled, On Second Thought (OST), for deleting or recalling an unwanted Multimedia Messaging Services (MMS) and Short Messaging Services (SMS) message on a mobile device before the message is delivered to the intended recipient is provided. The OST application operates by running on top of a resident messaging application on the mobile device. A user of the OST application can choose to cache a message he or she sent for a predetermined amount of time set by the user, which is equivalent to a time delay for sending the message and is typically between 0 and 60 seconds. Only the user who wants to send delayed messages needs to install the OST application on the mobile device and the recipients of the delayed messages do not need to have the OST application installed on their mobile devices in order to receive the delayed messages or respond to the delayed messages. The message is composed on the resident messaging application and the OST application keeps the message in a buffer for a predetermined amount of time after the user hits the "send" button on the OST application. This feature allows the user to delete or recall the message he or she just sent within the predetermined amount of time if he or she regrets sending the message. Preferably, after the user selects to send, the predetermined period is the only time that the user can delete or retrieve the message for further editing. During the predetermined amount of time, the user can swipe the sent message to retrieve and delete the message. Once the message is sent, and before it reaches the recipient, the sent message would appear in the conversation screen with a timer showing how much time is left before it is transmitted to the recipient or before it leaves the mobile device on which the OST application is installed. After clicking on the "send" button, the OST application would also indicate the status of the sent message as pending. Once the predetermined amount of time is up, the sent message is delivered to the recipient and the OST application changes the status of the sent message from pending to delivered. The buffer may be a software buffer built into the OST application or a memory housed on the mobile device being utilized by the OST application.

In another preferred embodiment of the invention, the OST application may further have a "curfew" feature. The "curfew" feature allows the user to set another predetermined amount of time during which the sent message is embargoed and after which the embargoed sent message is delivered only if the user confirms delivering the embargoed sent message to the recipient. The another predetermined amount of time may be longer than the predetermined amount of time.

In some embodiments, a software application (module, plugin, tool, app, etc.) is implemented for communication with others using the creation (by way of editing) of individual messages, transmitting messages over communication network or channel, and receiving messages over the communication network or channel into the software application for viewing. The user interface and communication type can be a chat type form of interface and communication (e.g., subsequent messages are automatically populated with destination information in the message chain to form a conversation). The application can be an overlay on top of the actual application that receives and transmits the messages (e.g., over text message software on a phone) or could be integrated into that application. The user interface can include an interactive command selectable by the current user to send the message inputted in the mobile device by the user. The application is configured on the mobile device and adapts the mobile device and related applications such that in response to the selection of the send option, the application (or system) temporarily holds the message from being transmitted to the identified recipient of the message while the displaying the content of the message to the user for further inspection. The application also displays an indicator such as a graphical indicator communicating to the user that the message is in this temporary hold (while the mobile device is operatively connected to the communication network or channel for carrying the message). During this time, the application only permits the user option to select to delete the message (delete the message during the temporary hold) or retrieve the message for further editing. If desired, other limited capabilities may be made available also during this time period. The application also displays a timer or countdown indicator that visually communicates how much time is left in the temporary hold before the message is transmitted, delivered, or otherwise made available to the intended recipient. The time period specified for the temporary hold period can be specified by the user through the application settings or can be a fixed period specified by the software provider of the application. The application on the mobile device is configured to display message itself and make the message (e.g., message bubble that contains the message) interactive by providing the capability for the user to apply one or more gestures to the message that apply an operation to the sent message while it is in temporary hold such as to swipe in one direction to delete or swipe in a different direction to retrieve. When a delete command is selected, the application deletes the "sent" message from the mobile device before it is transmitted over the communication network or channel to the intended recipient. When a retrieve command is selected, the application retrieves the message from the temporary hold and blocks the message from being sent. It also displays the message for further editing or revision by the user.

The application can be an added layer that when installed integrates with the communications software on the mobile device. For example, it could be installed as an App from an app store and when installed it can act as if it is your text message software on the mobile device and in so doing uses the preexisting text message application on the mobile device to actually send and receive messages.

If desired, in some embodiments, a configuration may exist that temporarily holds the software outside the mobile device such as by temporarily holding the software on an external server or service. In this embodiment, the message for example would be sent from the mobile device to the server and the temporary hold including timer and visual indicator of hold would be displayed on the user' mobile device to allow retrieval or deletion. In this variation, the application would then delete or retrieve the message in a similar way from the server.

If desired, messages can be personal communication messages in which a user communicates to other persons using the personal mobile device and communications words, images, or video to their personal contacts. The message will typically include a destination address of an individual or group. In some embodiments, other types of personal communications can be applied such as communications that transfer money between individuals, in which the transmission of the transfer messages results in the operation of a financial transfer in accordance with the specific details of the transfer message. (e.g., if directed to the wrong person, the money would go to the wrong person).

As generally described herein, software implemented on a mobile device carries out the interactions or processes described herein as result of the implementation of the software on the device and its use of potentially other software or related hardware on the device.

In accordance with one embodiment of the present invention, a method for message communication management of personal mobile wireless devices by using an interactive mobile software application is described. The method comprises implementing the interactive mobile software application on a personal mobile wireless device, wherein the application implements a process comprising: providing an interactive user interface on the device for entering and sending messages; and in response to the user entering a message and sending the entered message, holding the entered message back from being sent from the personal mobile wireless device and over a communication network for a predetermined period of time that permits the user to recall or delete the message before it is transmitted over the communication network.

In one embodiment, the mobile software application is a mobile software application that is installed over a message communication application that receives and transmits messages.

In one embodiment, the method further comprises implementing interactive user preference settings that allows individual users to select recall or curfew settings.

In one embodiment, the method further comprises a curfew setting, the curfew setting comprises a locator in which the locator alerts the mobile software application so as to send a notification to the user to turn on the curfew settings if the locator notices that the user has spent longer than a predetermined amount of time in a location, wherein the locator receives location information from a GPS or other sources.

In one embodiment, the method further implements the interactive mobile software application to manage SMS and MMS messaging on the mobile wireless device.

In one embodiment, the interactive mobile software application is an application that is installed by the user and the installation makes the interactive mobile software application the default application for messaging and replying an existing SMS/MMS messaging application.

In one embodiment, the interactive mobile software application holds the message in a buffer before sending.

In one embodiment, the interactive mobile software application displays the message in the window to the user as if it has been sent but with designation to show it is being held back.

In accordance with another embodiment of the present invention, a system for message communication management of personal mobile wireless devices is described. The system comprises a mobile software application installed on a mobile wireless device, the application comprising an interactive user interface on the mobile wireless device for entering and sending message; and a buffer, in response to a user entering a message and sending the entered message, holding the entered message back from being sent from the mobile wireless device and over a communication network for a predetermined period of time that permits the user to recall or delete the message before it is transmitted over the communication network.

In accordance with yet another embodiment of the present invention, a non-transitory computer readable medium storing an application causing a computer to execute message delay process is described. The message delay process comprises receiving an entered message from an interactive mobile software application installed on a personal mobile wireless device; and in response to a user sending the entered message, holding the entered message back from being sent from the personal mobile wireless device and over a communication network for a predetermined period of time that permits the user to recall or delete the message before it is transmitted over the communication network.

In accordance with yet another embodiment of the present invention, a system for message communication management of personal mobile wireless devices is described. The system comprises a mobile software application on a personal mobile wireless device, wherein the application comprising integrated contacts comprising contacts gathered from different chat platforms, a predetermined amount of time set by a user of the person mobile wireless device to delay a message sent on the mobile software application and to delete or recall the sent message during the predetermined amount of time, and another predetermined amount of time set by the user to delay the sent message and to confirm delivery of the sent message to a recipient after the another predetermined amount of time expires.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
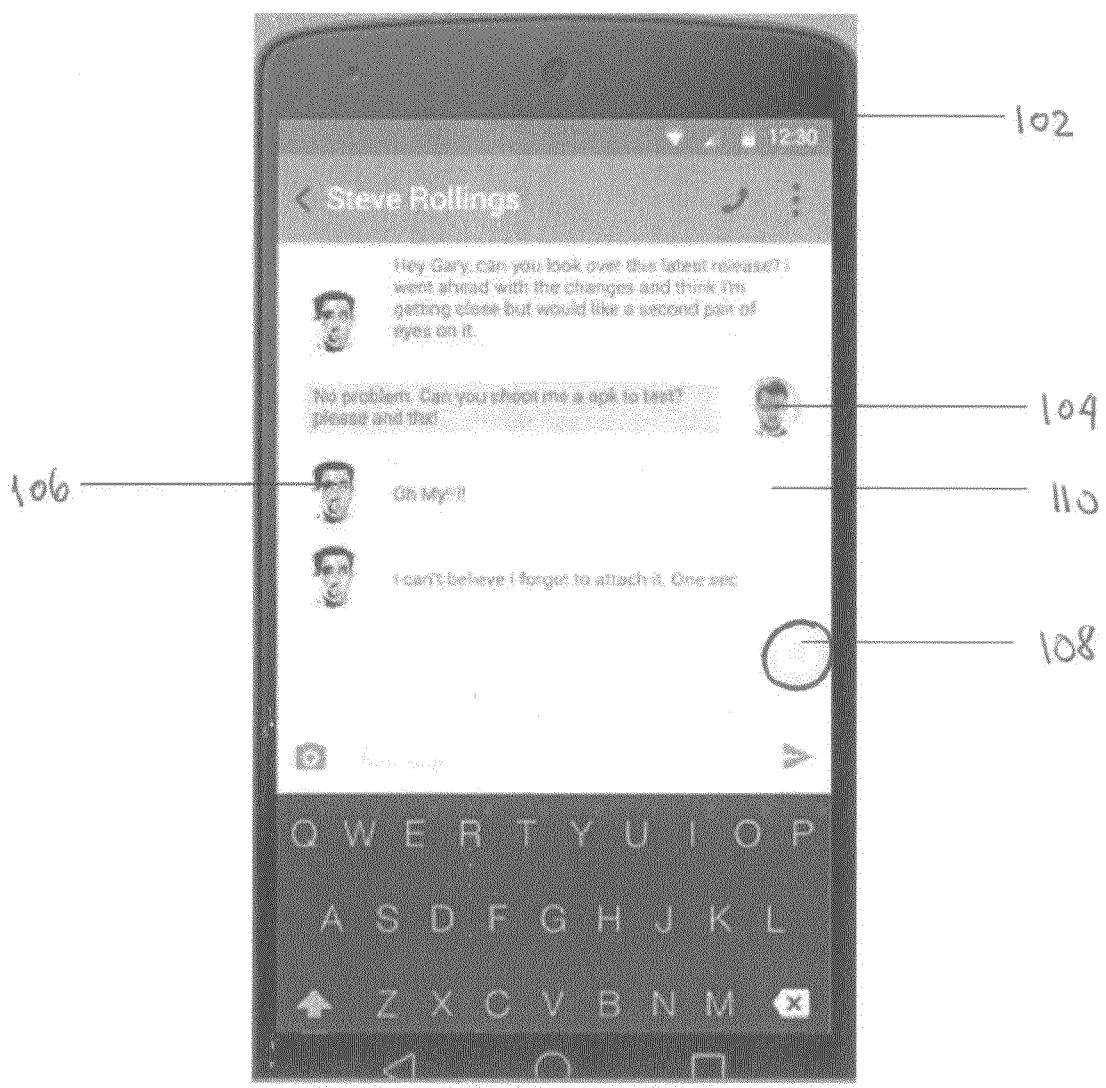
FIG. 1 depicts an exemplary schematic interface representation of an embodiment of the OST application used on a mobile device.

In this respect there has thus been outlined rather broadly the more important features of the instant invention, in order that the detailed description thereof that follows may be better understood, and in order that the present contribution to the art may be better appreciated.

There are additional features of the instant invention, which will be described hereinafter, and which will form the subject matter of the claims appended hereto.

Further in relation to this, before explaining at least the preferred embodiments of the invention in greater detail, it is to be understood that the invention is not limited in its application to the details of construction and to the arrangements of the components set forth in the following description, or illustrated in the appended Figures. The invention is capable of other embodiments, and of being practiced and carried out in a plurality of different ways. Also it is to be understood that the terminology used herein is for the purpose of description and should not be regarded as a limiting factor.

As a preliminary matter, it will readily be understood by one having ordinary skill in the relevant art that the present invention has broad utility and application. Other embodiments may be discussed for additional illustrative purposes in providing a full and enabling disclosure of the present invention. Moreover many embodiments such as adaptations, variations, modifications, and equivalent arrangements will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed to limit the scope of patent protection afforded by the present invention, which scope is to be defined by the claims and the equivalents thereof. It is not intended that the scope of patent protection afforded the present invention be defined by reading into any claim a limitation found herein that does not explicitly appear in the claim itself.

Thus for example any sequence(s) and/or temporal order of steps of various processes or methods that are described herein are illustrative and should not be interpreted as being restrictive. Accordingly, it should be understood that although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders, while still falling within the scope of the present invention. Accordingly, it is intended that the scope of patent protection afforded the present invention is to be defined by the appended claims rather than the description set forth herein.

Additionally it is important to note that each term used herein refers to that which the ordinary artisan would understand such term to mean based on the contextual use of such term herein. To the extent that the meaning of a term used herein as understood by the ordinary artisan based on the contextual use of such term differs in any way from any particular dictionary definition of such term, it is intended that the meaning of the term as understood by the ordinary artisan will prevail.

The following definitions generally set forth the parameters of the present invention.

As used herein, "a" and "an" each generally denotes "at least one" but does not exclude a plurality unless the contextual use clearly dictates otherwise.

As used herein, the singular form "a", "and", and "the" include plural referents unless the context clearly dictates otherwise.

Now generally referring to the drawings in which like numerals represent like components throughout the several views, the preferred embodiments of the present invention are next described. The following description of one or more preferred embodiment(s) is merely exemplary in nature and is in no way intended to limit the invention, its application, or uses.

FIG. 1 depicts an embodiment of the present invention, which is an exemplary schematic interface 110 representation of the OST application (overlay application) installed on a mobile device 102. The mobile device 102 may include but not limited to iPhones, Android-based smartphones, PDAs, tablets, near-field communication devices, devices with applications implemented at least partly using a cloud service and any other complementary and equivalent devices that are capable of voice and data transmission including personal messaging. It is understood that the configuration of the interface 110 is exemplary and that the interface 110 may include alternative and additional functional and aesthetic features. Although reference to the interface 110 is made with respect to the mobile device 102, it is understood that the interface 110 is useful with any mobile device and that any discussion herein with respect to the mobile device 102 is made for the exemplary purpose and should not serve to limit any features disclosed herein.

As demonstrated in FIGS. 1, 2A, 2B, and 3, one preferred embodiment of the OST application (overlay application) for deleting and recalling an unwanted Multimedia Messaging Services (MMS) or Short Messaging Services (SMS) message on a mobile device 102 before the message is delivered to the intended recipient is contemplated. The OST application operates by running on top of a resident messaging application on the mobile device 102 and delaying the delivery of a message composed on the resident messaging application to the recipient for a predetermined amount of time set by the user of the mobile device. The resident message application may be an onboard or default SMS/MMS application that is pre-installed on the mobile device during manufacture and assembly, a SMS/MMS application that is subsequently installed on the mobile device by the user to override or replace the default SMS/MMS application (such as Handcent, chomp, Textra etc.), or any other application on the mobile device that can transmit text and media messages (such as WeChat, What's App, Line, Facebook Messenger, G-Chat, Facebook Messenger, Snapchat etc.).

Figure 2A:
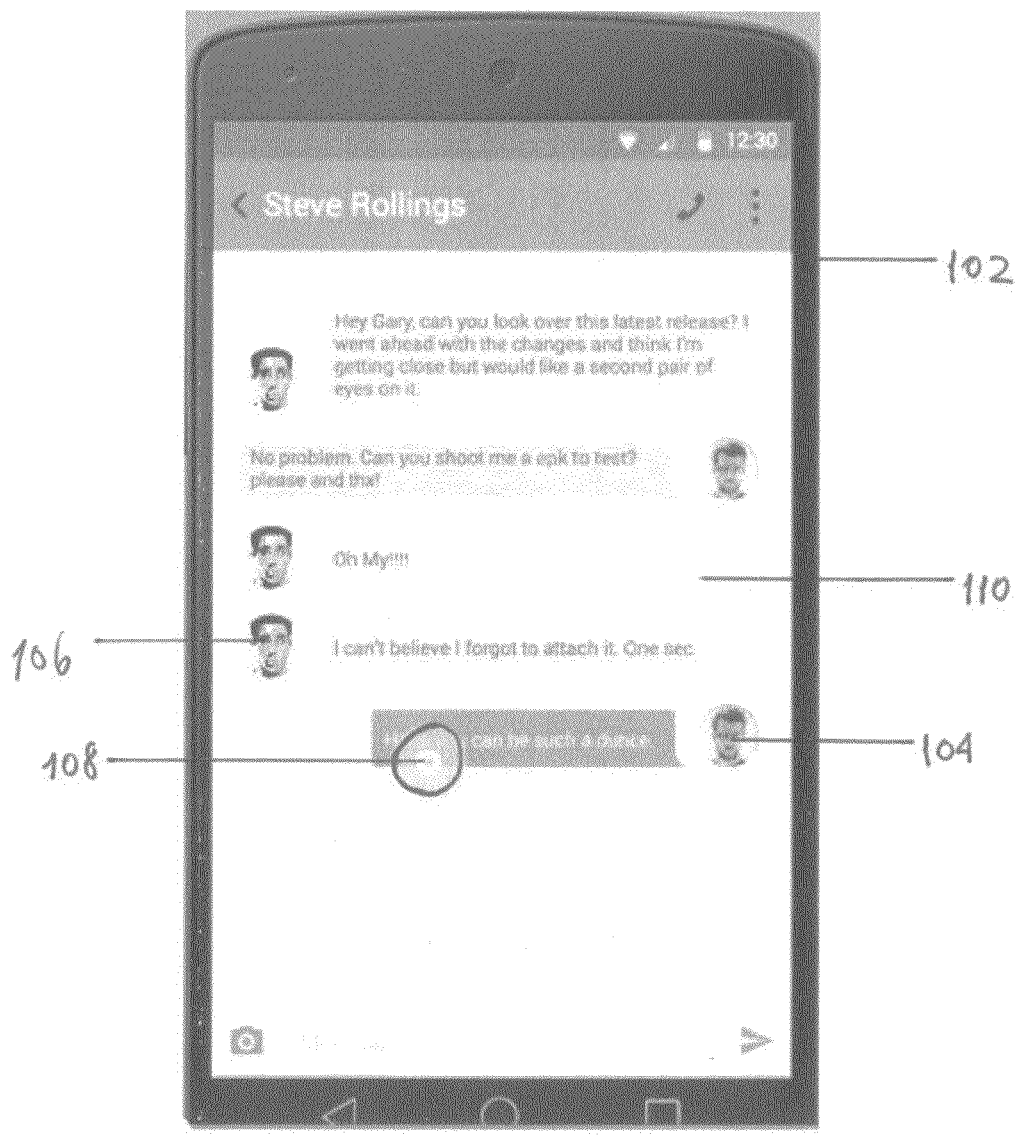
FIGS. 2A and 2B depict exemplary schematic interface representations of an embodiment of the OST application deleting a message before delivering to the recipient.

FIGS. 1, 2A, 2B, and 3 also depict a hypothetical scenario where a user 104 having the OST application (overlay application) installed on the mobile device 102 is communicating with another person 106. The OST application provides a maneuverable OST button 108 which may be used to indicate delay and used by the user 104 to delete or recall a message. The maneuverable OST button 108 may start by appearing adjacent to a bezel of the mobile device 102 when there is no message being delayed by the OST application as shown in FIG. 1 (initial position of the maneuverable OST button 108). When the user 104 composes a message on the resident messaging application and sends the composed message by clicking the "send" button on the resident messaging application, the length of the message extends the maneuverable OST button 108 toward another bezel of the mobile device 102 as shown in FIG. 2A (extended position of the maneuverable OST button 108). Because the OST application operates on top of the resident messaging application, the OST application delays (or prevents) the delivery of the message for the predetermined amount of time set by the user 104, even though the user has already pressed the "send" button of the resident messaging application. During the predetermined amount of time, the message is cached in a buffer for an amount of time set by the user 104 on the OST application. The predetermined amount of time is preferably between 0 and 60 seconds. The buffer may be a software buffer built into the OST application or a memory on the mobile device being utilized by the OST application. As such, the delay feature of the OST application does not involve or require storing any data on any servers or devices (such as routers and modems) on the telecommunication network (such as Wi-Fi, 802.11, Bluetooth, radio frequency systems, VOIP, infrared, GSM, GSM plus EDGE, CDMA, quadband protocols) to cache the message. Since the predetermined amount of time is set by the user and it operates independently of the servers and devices on the telecommunication (or solely on the mobile device 102), the delay provided by the OST application is beyond the inherent delay associated with the hardware and software on the mobile device 102 and the inherent delay associated with the software of the OST application for performing their basic functions such as but not limited to the time needed to turn on or off of a hardware component, the time needed to start or shut down an operating system, the time needed to transmit data between hardware components, etc.

Figure 8:
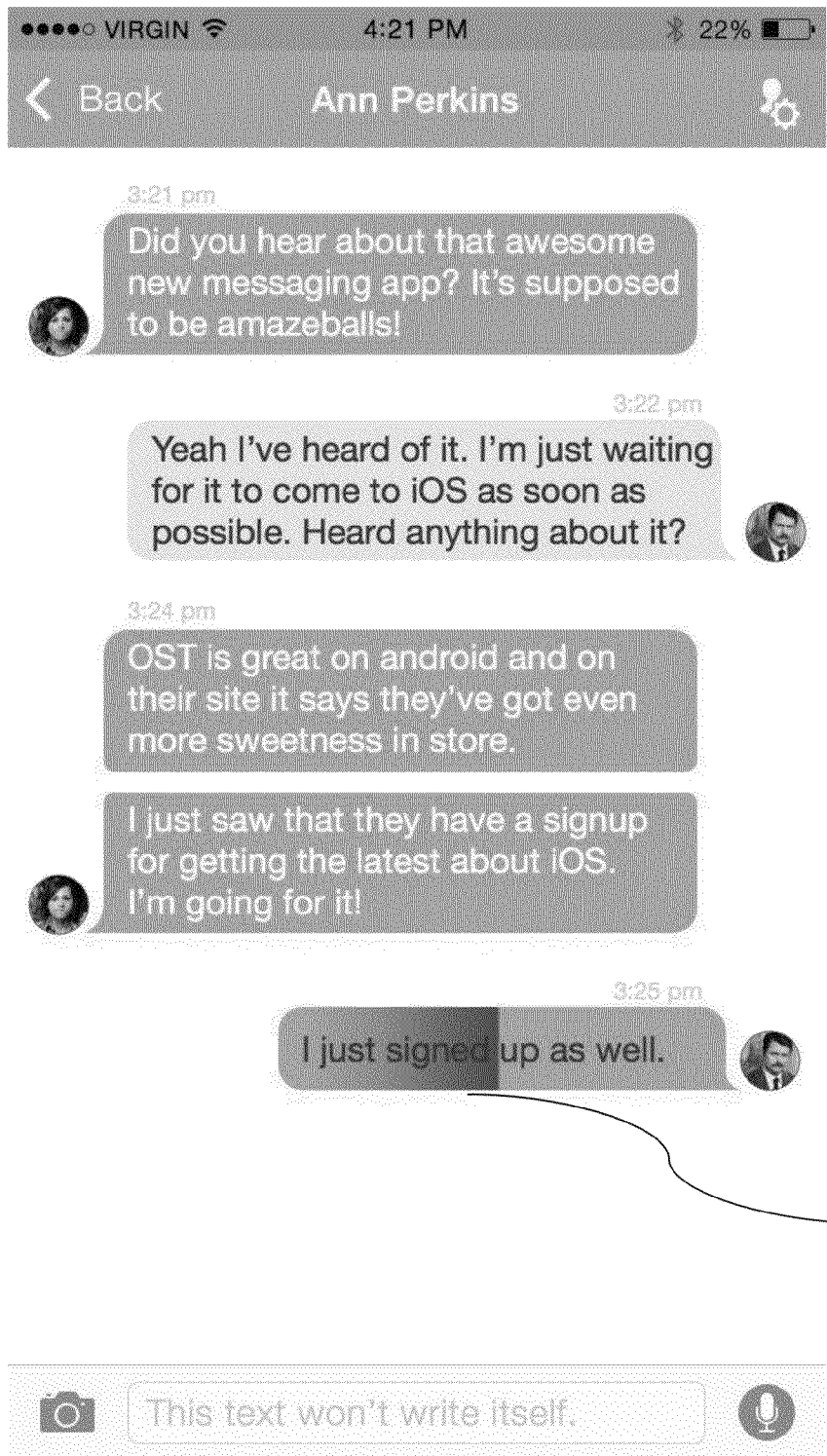
FIG. 8 shows one embodiment of a gradient counter or timer moving across both the text and background of the message.

The OST application may have a counter or timer showing how much time of the predetermined amount of time is left before the message is delivered to the recipient. The counter or timer may appear within, adjacent to, or away from the maneuverable OST button 108. The counter or timer may also appear in the notification bar where the current time, the mobile device signal strength, and the battery level are located. The OST application may further have a status indicator showing that the message is pending after hitting the "send" button. The status indicator may also appear within, adjacent to, or away from the maneuverable OST button 108 or in the notification bar. The counter or timer may also appear as a gradient on the text of the message, the background of the message, or both the text and background of the message. For example, the text, background, or both may appear in a first color, such as orange, after the user hit the "send" button with a gradient moving across the text, background, or both. The amount of time the gradient moves across the text, background, or both is equivalent to the predetermined amount of time set by the user. FIG. 8 shows one embodiment of a gradient counter or timer 377 moving across both the text and background of the message. When the predetermined amount of time is up, the OST application allows the resident messaging application to deliver the message to the recipient. The status indicator would also change the status of the message from pending to delivered. The counter or timer in the form of a gradient may briefly turn into a second color, such as green, and then fade into a third color, such as light gray, indicating that the message is beyond delete or recall. In one embodiment, when the sent message is cached during the predetermined amount of time, the cached message remains visible to the user with the counter during the predetermined amount of time (for a limited amount of time). After the predetermined amount of time expires, and if the user does not delete or recall the cached message during the predetermined amount of time, the cached message will be delivered to the recipient and the delivered message will be moved to and stored in a delivered queue without showing the counter for later viewing by the user.

Figure 2B:
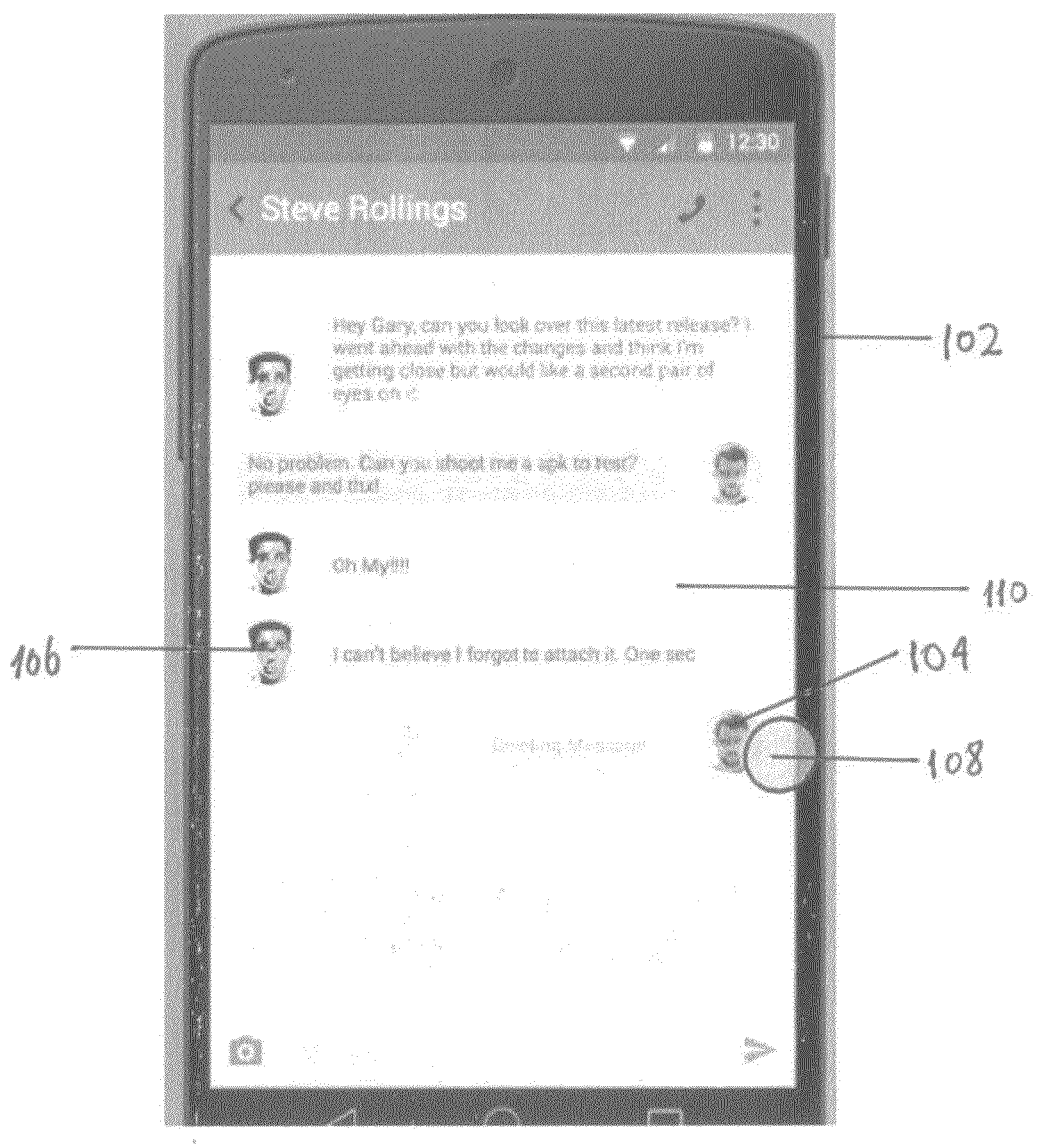
Figure 3:
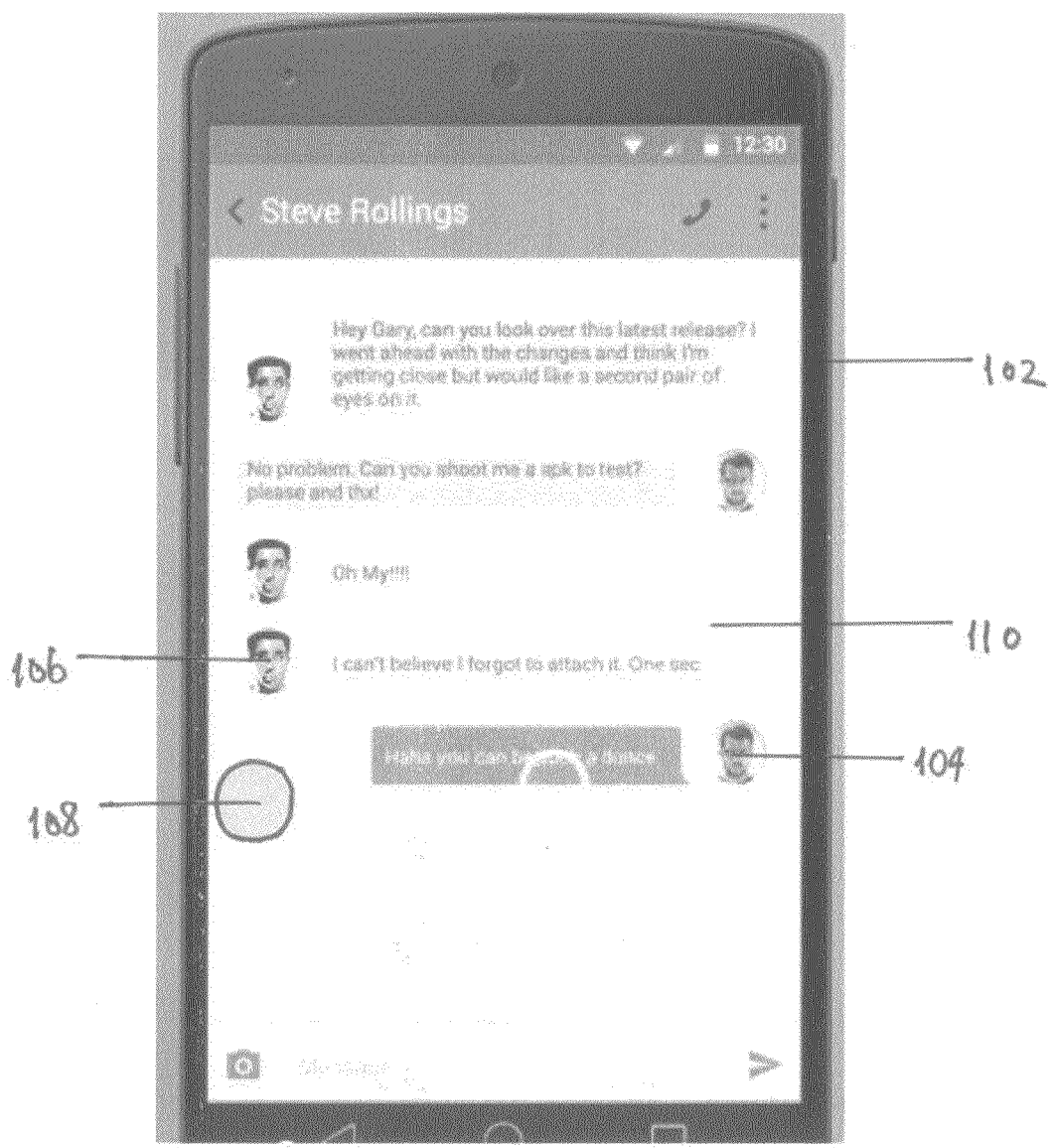
FIG. 3 depicts an exemplary schematic interface representation of an embodiment of the OST application recalling a message before delivering to the recipient.

During the delay or the predetermined amount of time, the user 104 may either delete or recall the message he or she sent. To delete the sent message, the user 104 may scroll or swipe the maneuverable OST button 108 from left to right or from its extended position to its initial position as shown in FIGS. 2A and 2B. In other words, the user 104 swipes the maneuverable OST button 108 on the sent message to the right to delete the sent message. To recall the sent message, the user 104 may further scroll or swipe the maneuverable OST button 108 to the left from its extended position as shown in FIG. 3 (further extended position of the maneuverable OST button 108). In other words, the user 104 swipes the maneuverable OST button 108 on the sent message to the left to recall the sent message. Delete erases the entire sent message and the user 104 retypes another message from scratch if he or she wishes to send another message. Recall retrieves the entire sent message for correcting typographical errors and/or further editing the message without erasing any content in the message. If the user 104 does not swipe the maneuverable OST button 108 during the predetermined amount of time, the sent message will be delivered to the recipient after the predetermined amount of time expires.

The OST button 108 is maneuverable because it can be moved by a finger or fingers of the user 104 in different directions on screen of the mobile device or on the conservation screen of the resident messaging application. Although maneuvering or swiping the OST button 108 to the right is associated with deleting the message and maneuvering or swiping the OST button 108 to the left is associated with recalling the message in the above embodiment, deleting and recalling the message may be associated with other maneuvering methods or directions. Other maneuvering methods include number of taps, number of swipes, number of fingers simultaneously pressing on the OST button 108, etc. Other maneuvering directions include up and down and certain patterned directions (such as a zigzag pattern). In one embodiment, the message may be deleted by performing a first maneuvering method/direction and the message may be recalled by performing a second maneuvering method/direction different from the first maneuvering method/direction.

Figure 4:
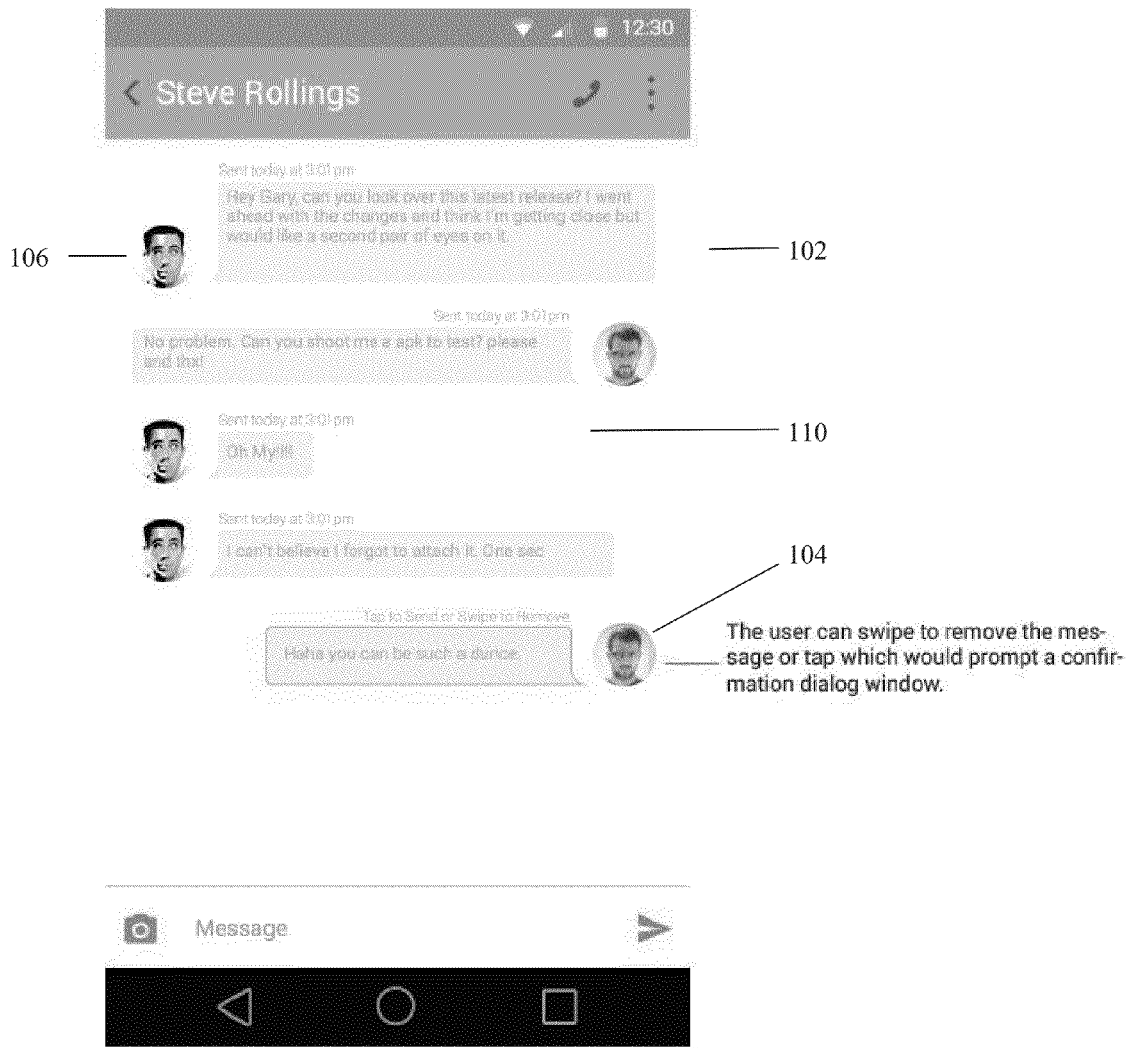
FIGS. 4 and 5 depict one embodiment of the curfew feature of the OST application.
Figure 5:
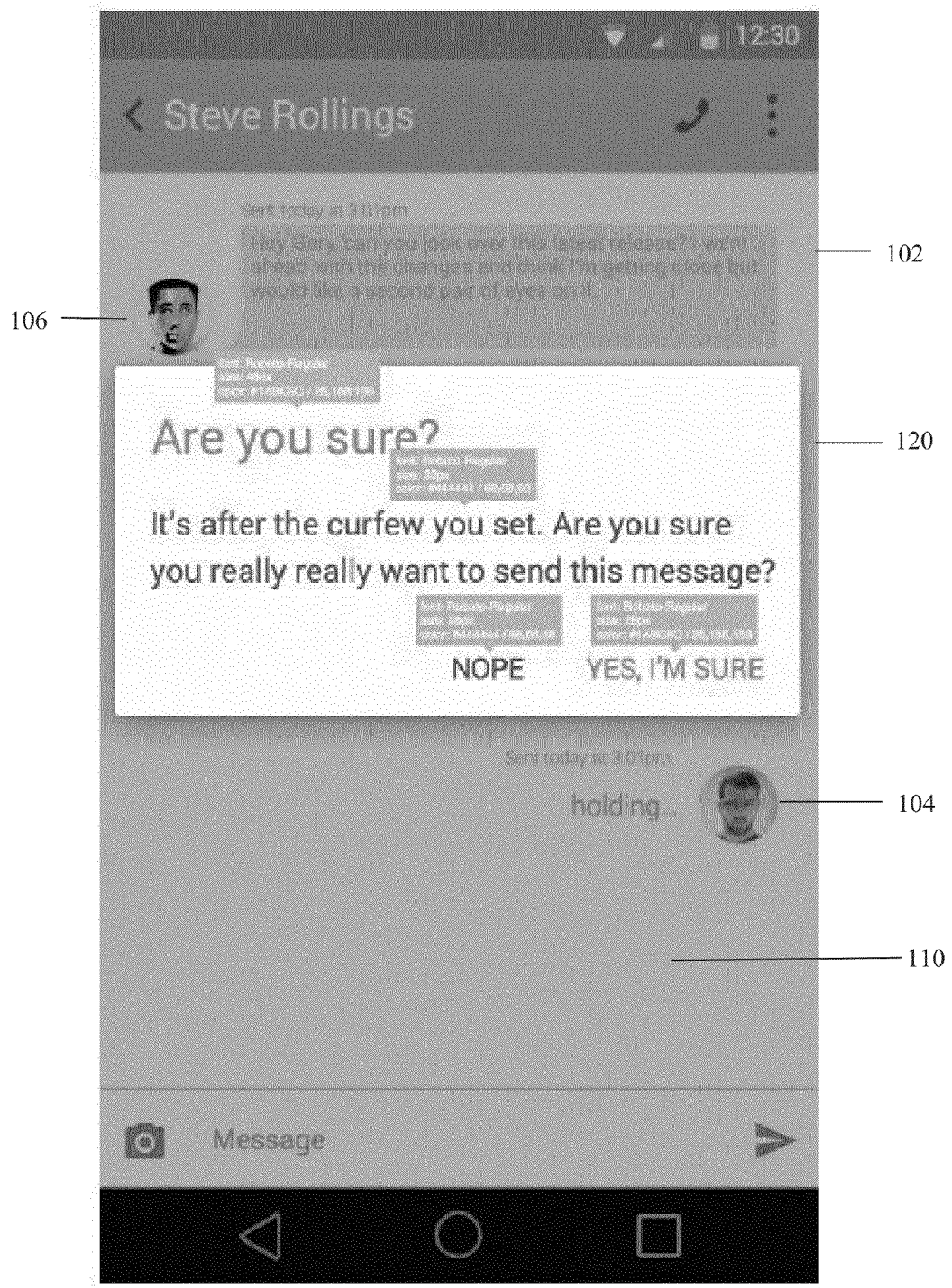

Referring to FIGS. 4 and 5, the OST application (overlay application) may further have a "curfew" feature. The "curfew" feature allows the user to set another predetermined amount of time during which the sent message is embargoed and after which the embargoed sent message is delivered only if the user confirms delivering the embargoed sent message to the recipient. Unlike the delay/delete/recall features described above, the "curfew" feature does not automatically deliver the message to the recipient after the another predetermined amount of time expires. Instead it always asks the user to confirm if he or she really wants to deliver the message after the another predetermined amount of time expires. The another predetermined amount of time is preferably longer than the predetermined amount of time. For example, the user turns on the "curfew" feature and sets the another predetermined amount of time to be 24 hours. The user composes a message and sends it by hitting the "send" button. The sent message is subsequently embargoed or cached in a curfew queue for 24 hours (FIG. 4) and the OST application will automatically ask the user if he or she wants to deliver the message that he or she composed 24 hours ago after the another predetermined amount of time expires (FIG. 5). If the user responds with yes, the message will then be delivered to the recipient. If the users responds with no, the message will not be delivered to the recipient. The "curfew" feature may apply to one message, some messages, or all the messages composed by the user. When the "curfew" feature is set to apply to some or all of the messages, the user can review some or all of the embargoed messages and decide which embargoed messages should be delivered and which one should not be delivered after the another predetermined amount of time of some or all of the messages have expired. For example, the user sets the another predetermined amount of time to be 24 hours and the user sends a message at 9:00 a.m. on Monday, a second message at 10:00 a.m. on the same Monday, and a third message at 11:00 a.m. on the same Monday, the user will be able to go through all three messages and decide which of the message that he or she actually wants to be delivered to the recipient when he or she checks the OST application at 11:00 a.m. or later on Tuesday. If the user checks the OST application between 10:00 a.m. and 10:59 a.m. on the same Tuesday, the user will be able to go through the first and second message and decide which of those message that he or she actually wants to be delivered to the recipient. The OST application may also have the option to deliver the sent message before the another predetermined amount of time expires. The user may allow delivery of the sent message before the predetermined amount of time expires by swiping or tapping the sent message (FIG. 4). Swiping or tapping the sent message prompts a confirmation window 120 asking the user if he or she really wants to send (or deliver) the embargoed message (FIG. 5). The user may respond with yes to send or deliver the embargoed message before the another predetermined amount of time is up. The user may also respond with no to continue embargoing the message. The curfewed or embargoed message may be designated with a color different from the delayed message described above such as orange to distinguish those two types of messages.

In another embodiment of the "curfew" feature, the user may set up a particular time during which all messages sent on the resident messaging application are held in the curfew queue until the allotted time is up (FIG. 4). The user then can choose to deliver to delete some or all of messages sent during the particular time. For example, the user may set up the particular time to be from 10:00 p.m. until 5:00 a.m. All the messages sent on the resident messaging application during that period of time would be held in the curfew queue. The user would be able to select which messages he or she wants to deliver or delete starting at 5:00 a.m. The held message may also be sent or delivered before the allotted time is up as described above by swiping or tapping the held message to prompt a confirmation window.

The "curfew" feature also preferably has a locator such as one using GPS location information from the mobile device or using other sources. The GPS locator has a function of alerting the OST application to send a notification asking the user 104 if he or she would like to turn on the "curfew" feature when the GPS locator senses that the user 104 has spent a time longer than a certain period of time somewhere such as at a bar.

In one embodiment of the "curfew" feature, the "curfew" feature may also appear with a counter or timer. When the sent message is embargoed during the another predetermined amount of time, the embargoed message may remain visible to the user with the counter during the other predetermined amount of time (for a limited amount of time). After the another predetermined amount of time expires, and the user confirms delivery of the sent message, the embargoed message will be delivered to the recipient and the delivered message will be moved to and stored in a delivered queue without showing the counter for later viewing by the user. The status of the message may also be changed from pending to delivered if there is a status indicator.

Figure 6:
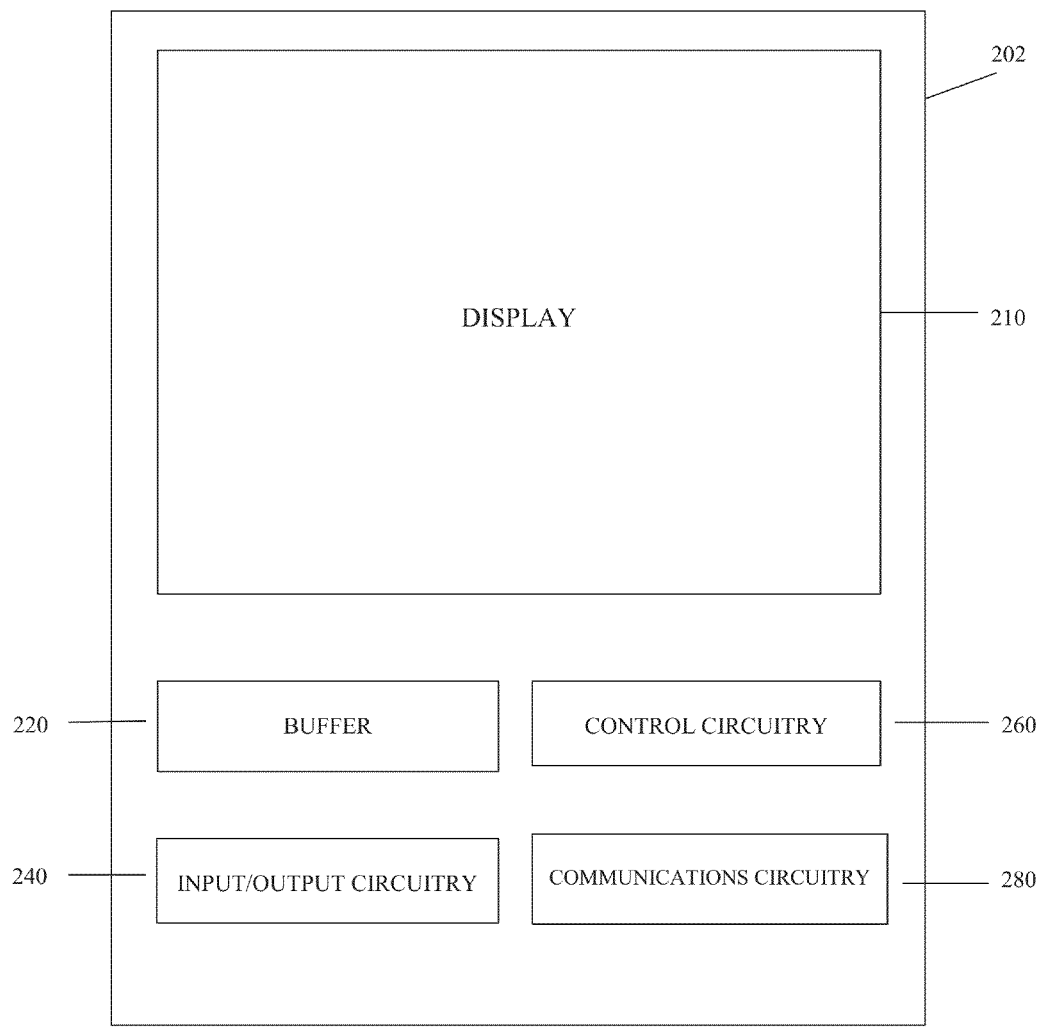
FIG. 6 depicts one embodiment of a mobile device.

Referring to FIG. 6, one embodiment of the mobile device 202 (or 102 in FIGS. 1-5) is illustrated. In a preferred embodiment, the mobile device 202 comprises a display 210, a buffer 220, an input/out (I/O) circuitry 240, a control circuitry 260, and a communications circuitry 280. As appreciated by those skilled in the art, the mobile device 202 can include other components not combined or included in those shown in this figure, e.g., a power supply, an input mechanism, etc.

Display 210 includes the display and display circuitry for providing a display visible to the user. For example, the display circuitry can include a screen, e.g., an LCD screen that is incorporated in the mobile device 202. In some embodiments, the display circuitry can include a coder/decoder (Codec) to convert digital data into analog signals and vice versa. For example, the display circuitry or other appropriate circuitry within the mobile device 202 can include Codecs necessary to process the transaction orders and the transaction execution time, or any other suitable type of Codec.

Buffer 220 can include, for example, one or more tangible computer storage devices including a hard-drive, solid state drive, flash memory, permanent memory such as ROM, magnetic, optical, semiconductor, or any other suitable type of storage component, or any combination thereof. Buffer can store or cache, for example, the delayed and embargoed messages, applications and application data for implementing functions on the mobile device 220, wireless connection data that can enable the mobile device 202 to establish a wireless connection, and any other suitable data or any combination thereof. The instructions for implementing the functions of the present invention may, as non-limiting examples, comprise non transient software and/or scripts stored in the computer-readable media 220. Buffer 220 may also be a semi-permanent memory such as RAM, and/or one or more types of memory used for temporarily storing data. In some embodiments, buffer 220 can also be used for storing data to operate mobile device applications or any other data from other components in the mobile device 220 such as display 210, input/out circuitry 240, control circuitry 260, and communications circuitry 280.

I/O circuitry 240 can be operative to convert and encode/decode, analog signals and other signals into digital data. In some embodiments, I/O circuitry 240 can also convert digital data into another type of signal, and vice-versa. For example, I/O circuitry 330 can receive and convert physical contact inputs from a multi-touch screen such as display 210, physical movements from a mouse or sensor, analog audio signals from a microphone, or other input. The digital data can be provided to and received from buffer 220, control circuitry 260, or any other component of the mobile device 202. Although I/O circuitry 240 is illustrated in this figure as a single component of the mobile device 202, several instances of I/O circuitry 240 can be included in the mobile device 202. The mobile device 202 can include any suitable interface or component for allowing a user to provide inputs to I/O circuitry 240. For example, the mobile device 202 can include a touch screen, e.g., display 210, a button, a keypad, a dial, a click wheel, etc.

Control circuitry 260 can include any processing circuitry or processor operative to control the operations and performance of the mobile device 202. For example, control circuitry 260 can be used to run operating system applications, firmware applications, or other applications used to communicate with other mobile devices, telecommunication servers, routers, or modems. Control circuitry 260 can drive the display 210 and process inputs received from a user interface, e.g., the display 210 if it is a touch screen.

Communications circuitry 280 can include any suitable communications circuitry operative to connect to a telecommunication network and to transmit communications, e.g., data from the mobile device to other mobile devices, servers, routers, modems, or computers. Communications circuitry 280 can be operative to interface with a telecommunication network using any suitable communications protocol such as Wi-Fi, 802.11, Bluetooth, radio frequency systems such as 900 MHz, 1.4 GHz, and 5.6 GHz communication systems, infrared, GSM, GSM plus EDGE, CDMA, quadband, and other cellular protocols, VOIP, or any other suitable protocol. The communications network may also be established by using wires such as an optical fiber or Ethernet cable. The mobile device can include one or more instances of communications circuitry 280 for simultaneously performing several communications operations using different telecommunication networks, although only one instance of communications circuitry 280 is shown in FIG. 6 to avoid overcomplicating the drawing. For example, the mobile device 101 can include a first instance of communications circuitry 280 for communicating over a cellular network, a second instance of communications circuitry 280 for communicating over Wi-Fi or using Bluetooth, and a third instance of communications circuitry 280 for communicating over an optical fiber. In some embodiments, the same instance of communications circuitry 280 can be operative to provide for communications over several telecommunication networks.

Figure 7A:
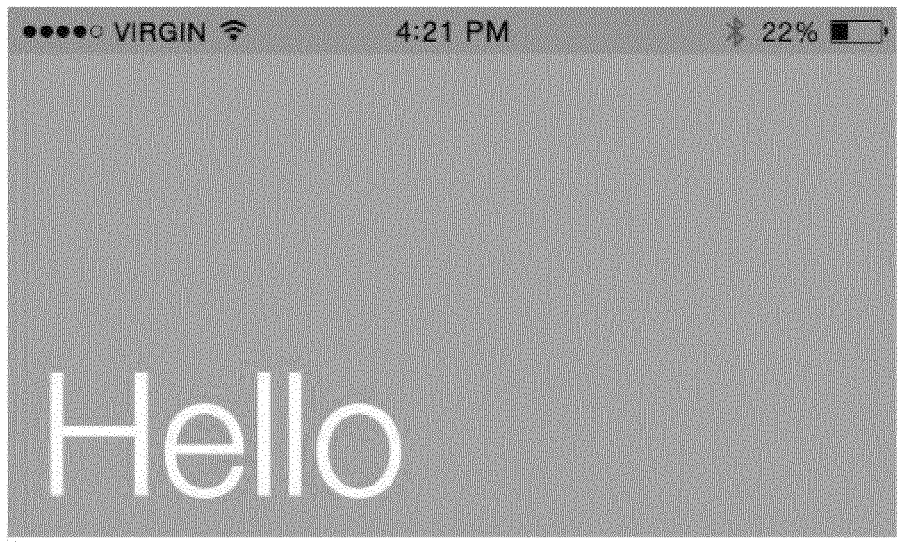
FIGS. 7A-7G depict one embodiment of the OST application integrating and communicating with contacts from different chat platforms.
Figure 7B:
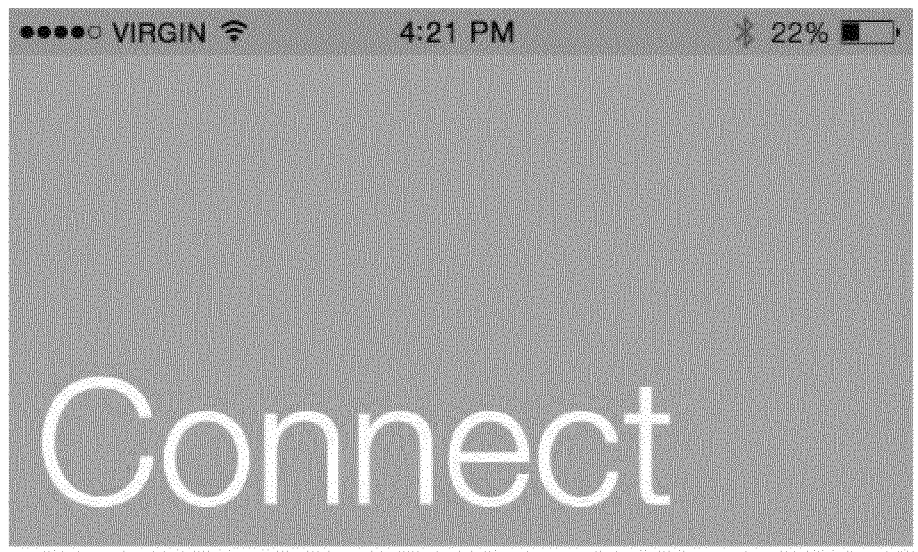
Figure 7B:
Figure 7C:
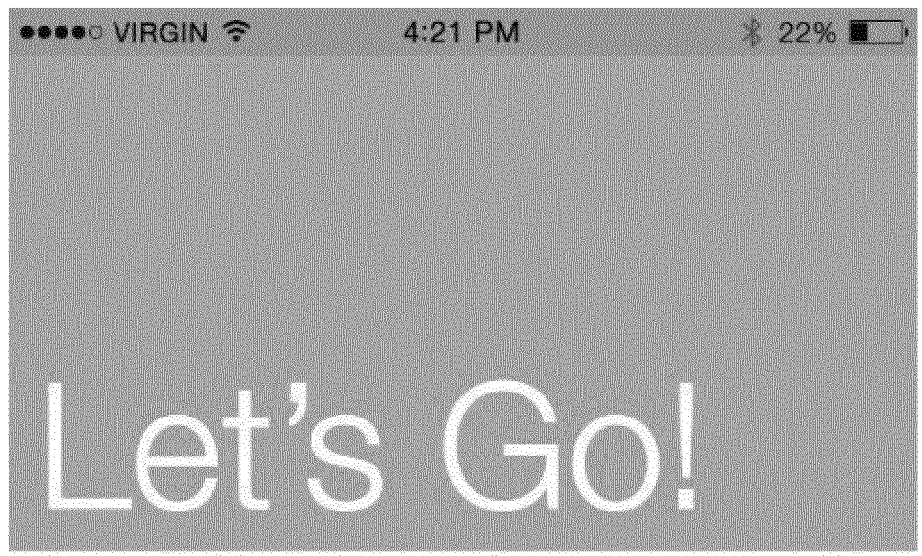

FIGS. 7A-7G depict one embodiment of the OST application integrating and communicating with contacts from different chat platforms. Referring to FIG. 7A, the OST application may start by confirming the phone number of the mobile device when the OST application is initiated for the first time after the installation of the OST application. After confirmation, the OST application detects all the chat platforms installed on the mobile device and asks the user of the mobile device to select which chat platforms he or she wants to be associated with the OST application or to be overlaid by the OST application as shown in FIG. 7B. After selection, the OST application affirms the selection with an affirmation message as shown in FIG. 7C.

Figure 7D:
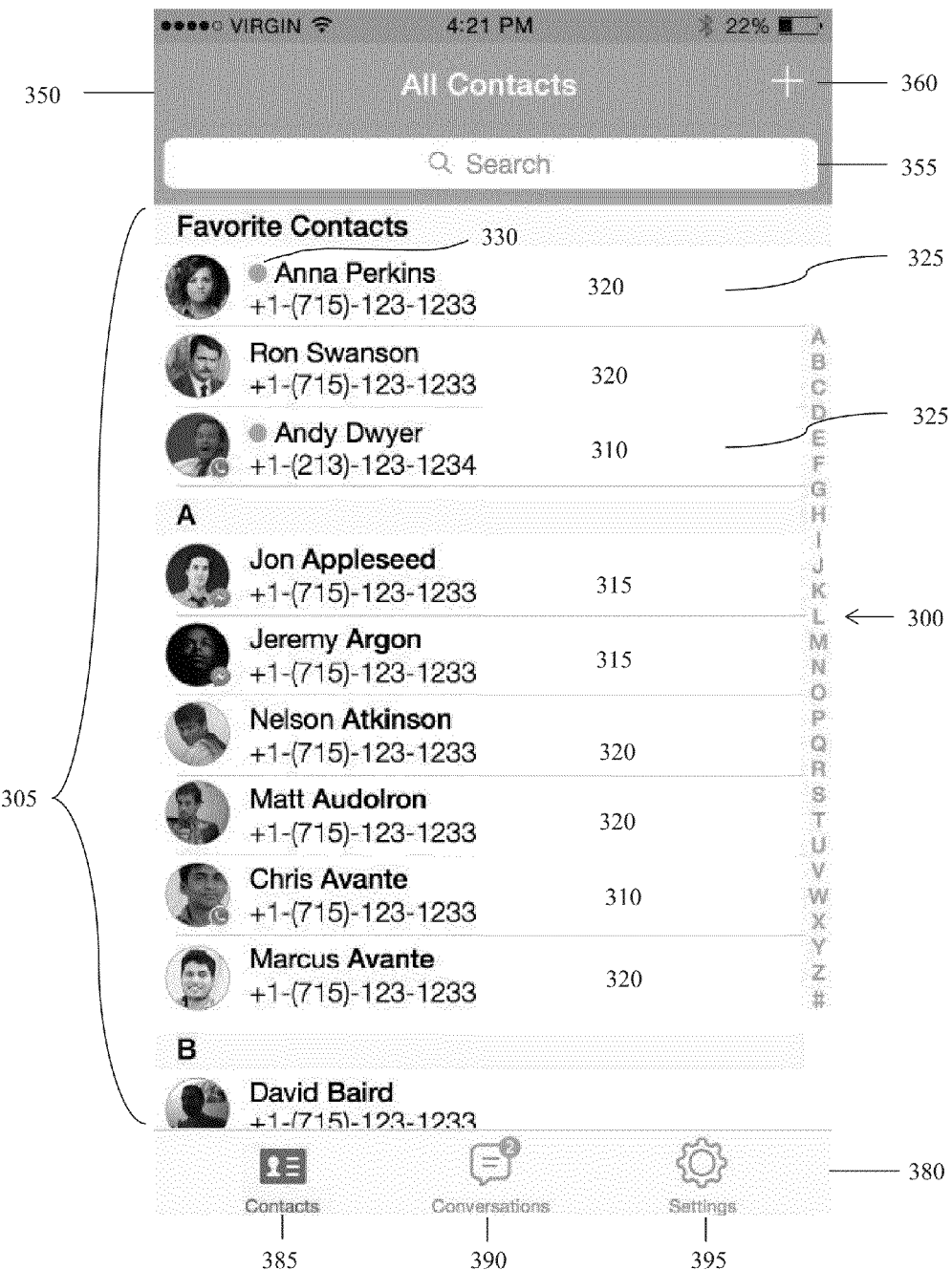
Figure 7E:
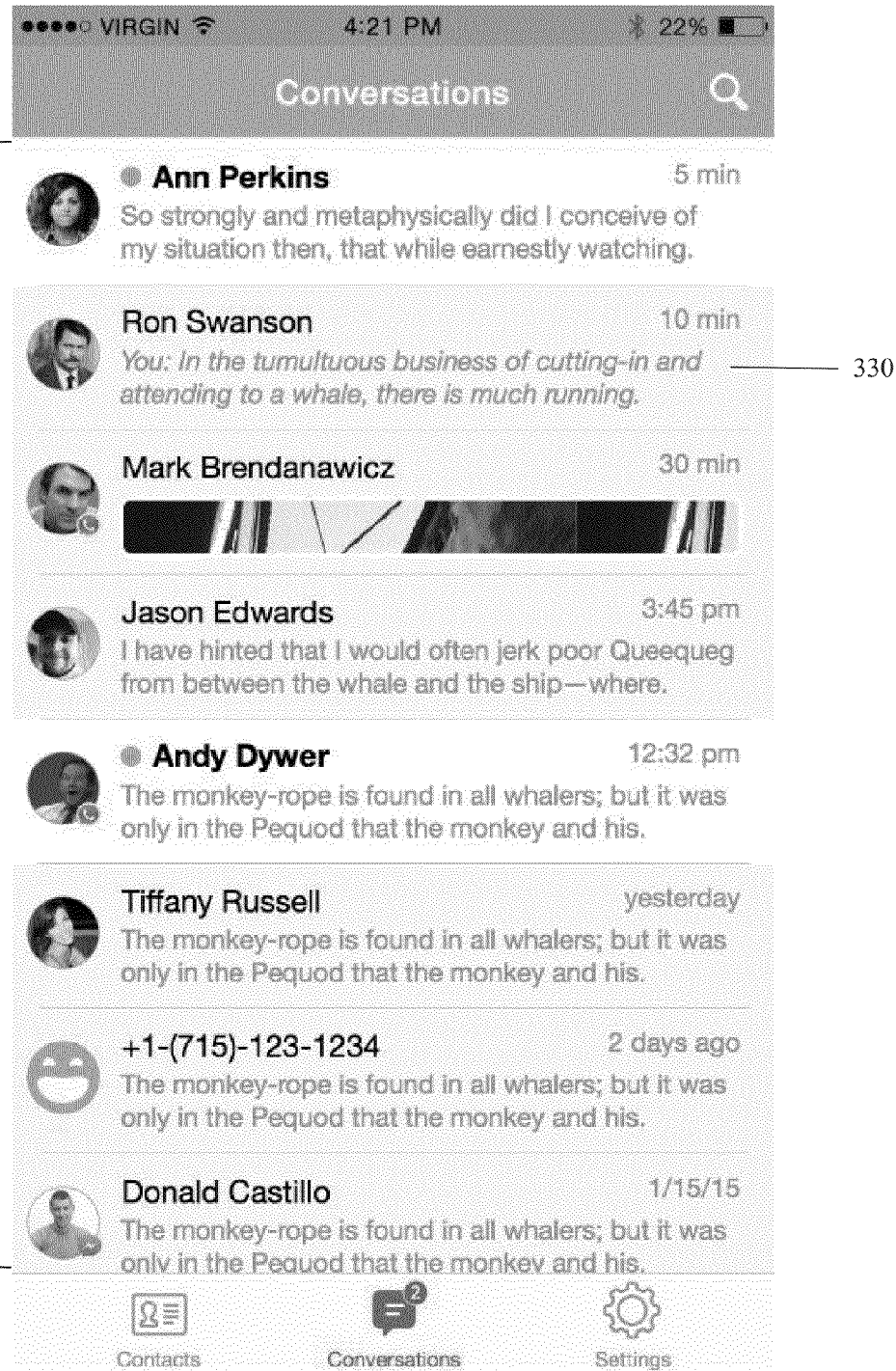
Figure 7F:
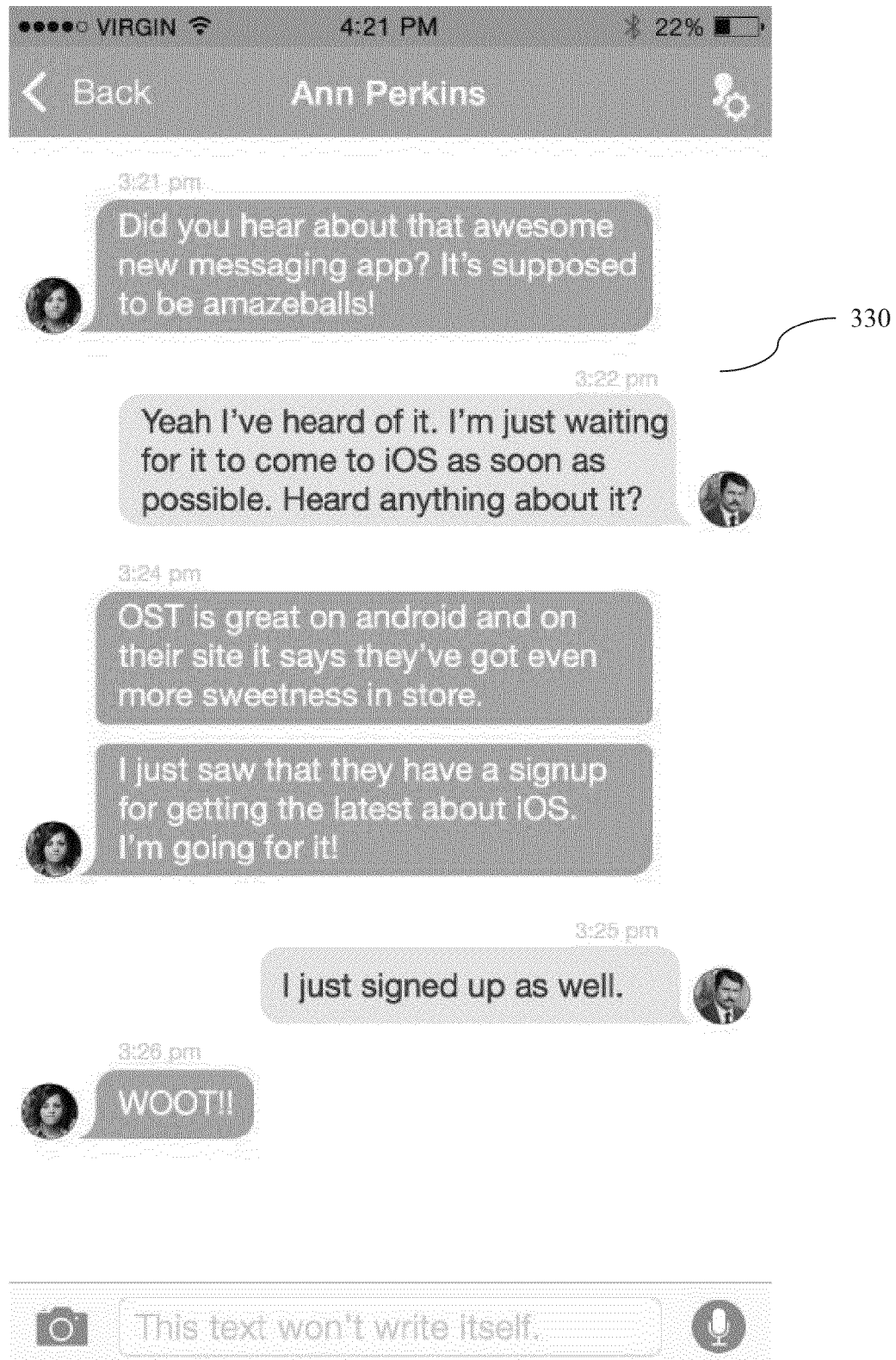
Figure 7G:
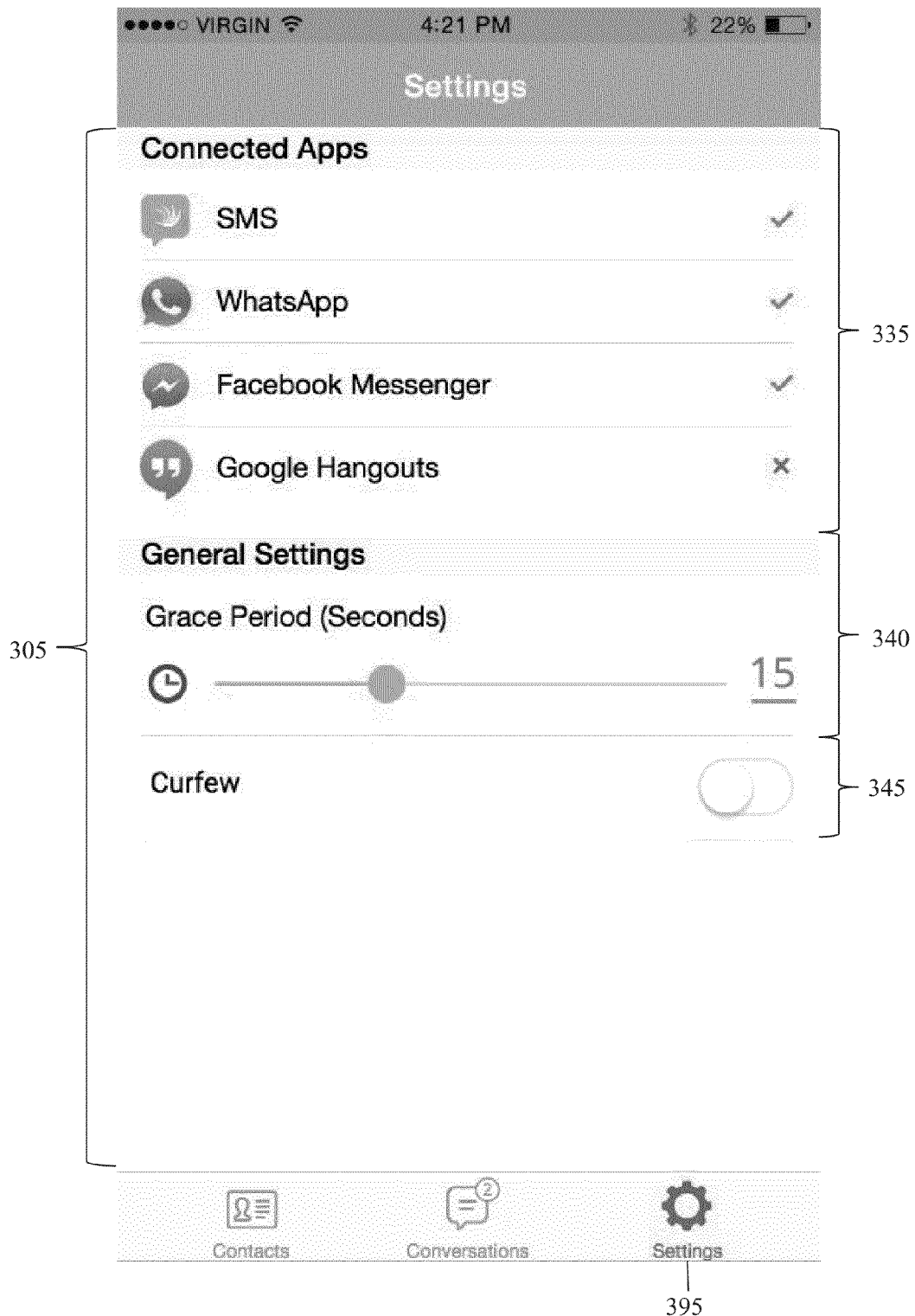

Referring to FIG. 7D, an interface 300 of the OST application is shown. The interface 300 may have a first window 305 for displaying integrated contacts 385, conversations between the user and the contacts 390, and settings of the OST application 395. FIG. 7D shows the first window 305 displaying all the integrated contacts 385 gathered from the chat platforms the user selected, such as contacts 310 from What's App, contacts 315 from Facebook Messenger, and contacts 320 from the default SMS/MMS application (integrated contacts view). The first window 305 may mark the contacts 325 who sent messages that have not yet being read by the user (unread messages) with an indicator 330, such as an orange dot, next to their names. The interface 300 may also have a second window 350 for searching a contact among all the contacts gathered 355 and for adding additional contacts to the OST application 360. The interface 300 may further have a third window 380 for switching views between the view of integrated contacts 385 ("contacts"), the view of conversations between the user and the contacts 390 ("conversations"), and the view of the settings of the OST application 395 ("settings") on the first window 305. FIG. 7E shows when the user selects "conversations" 390 and the first window 305 displays all conversations between the user and the contacts (conversations view). FIG. 7F shows the content of a particular conversation 330 between the user and a contact after the user selects that particular conversation 330 from all displayed conversations for further viewing. FIG. 7G shows, when the user selects "settings" 395, the first window 305 displays the applications or chat platforms 335 that are connected to the OST application, the grace period or the predetermined amount of time 340 set by the user, and the curfew feature 345 turned on or off by the user (settings view).

Based on FIGS. 7A-7G and the corresponding descriptions, the user of the OST application will be able to converse with his or her contacts on the OST application and on some or all of the different chat platforms on the mobile device. The OST application can integrate the user's accounts from some or all of the different chat platforms by signing into those chat platforms through the OST application (or by connecting the OST application to the application program interfaces, APIs, of those chat platforms). When a user receives a message from a contact from a chat platform, the user may respond to that message by sending a message on the OST application. The sent message may be delayed, deleted, recalled, or embargoed via the OST application if necessary. The contact will receive the responding message in the same chat platform from which the contact sent the message to the user. As such, in one embodiment, the OST application serves as one-stop destination for all the messaging communications and the user will be able to converse with all of his or her contacts from all of the different chat platforms from one place.

As shown above, the system and method is particularly suited and applicable to text messaging (SMS/MMS message over telephone networks). The OST application may also integrate contacts from other group messaging, chatting and instant messaging compatibility and communication applications and platforms. Those applications and platforms include but not limited to Handcent, chomp, Textra, WeChat, What's App, Line, Facebook Messenger, G-Chat, Facebook Messenger, Snapchat, etc. The OST application processes all the messages sent on the resident messaging application and creates a delay without relying on any servers or devices on the telecommunications network. The created delay is solely provided by the OST application and/or the mobile device on which the OST application is installed.

Although the present invention has been described and illustrated herein with referred to preferred embodiments, it will be apparent to those of ordinary skill in the art that other embodiments may perform similar functions and/or achieve like results. Thus it should be understood that various features and aspects of the disclosed of the disclosed embodiments can be combined with, or substituted for one another in order to form varying modes of the disclosed invention.

Unless defined otherwise, all technical and scientific terms used herein have same meaning as commonly understood by the person of ordinary skill in the art to which this invention belongs. Thus the scope of the embodiments of the present invention should be determined by the appended claims and their legal equivalents rather than by the Figures.

What is claimed is:

1. A method for message communication management of personal mobile wireless devices by using an interactive mobile software application comprising:
   implementing the interactive mobile software application on a personal mobile wireless device, wherein the application implements a process comprising:
   providing an interactive user interface on the device for entering and sending messages; and
   in response to the user entering a message and sending the entered message, holding the entered message back from being sent from the personal mobile wireless device and over a communication network for a predetermined period of time that permits the user to recall or delete the message before it is transmitted over the communication network, and
   implementing a curfew setting, wherein the curfew setting comprises a locator in which the locator alerts the mobile software application so as to send a notification to turn on the curfew settings if the locator notices that the user has spent longer than a predetermined amount of time in a location, wherein the locator receives location information from a GPS or other sources.

2. The method of claim 1, wherein the mobile software application is a mobile software application that is installed over a message communication application that receives and transmits messages.

3. The method based claim 1, wherein the interactive mobile software application is particularly implemented so as to manage SMS, instant messaging, and MMS messaging on the mobile wireless device.

4. The method based on claim 1, wherein the interactive mobile software application is an application that is installed by the user and the installation makes the interactive mobile software application the default application for messaging and replying an existing SMS/MMS messaging application.

5. The method based on claim 1, wherein the interactive mobile software application holds the message in a buffer before sending.

6. The method based on claim 1, wherein the interactive mobile software application displays the message in the window to the user as if it has been sent but with designation to show it is being held back.

7. A system for message communication management of personal mobile wireless devices comprising:
   a mobile software application installed on a mobile wireless device, the application comprising an interactive user interface on the mobile wireless device for entering and sending messages; and
   a buffer, in response to a user entering a message and sending the entered message, holding the entered message back from being sent from the mobile wireless device and over a communication network for a predetermined period of time that permits the user to recall or delete the message before it is transmitted over the communication network
   wherein the mobile software application includes a curfew setting comprising a locator in which the locator alerts the mobile software application so as to send a notification to turn on the curfew settings if the locator notices that the user has spent longer than a predetermined amount of time in a location, wherein the locator receives location information from a GPS or other sources.

8. The system of claim 7, wherein the interactive mobile software application is particularly implemented so as to manage SMS, instant messaging, and MMS messaging on the mobile wireless device.

9. The system of claim 7, wherein the interactive mobile software application is an application that is installed by the user and the installation makes the interactive mobile software application the default application for messaging and replying an existing SMS/MMS messaging application.

10. The system of claim 7, wherein the interactive mobile software application holds the message in a buffer before sending.

11. A non-transitory computer readable medium storing an application causing a computer to execute message delay process, the message delay process comprising:
   receiving an entered message from an interactive mobile software application installed on a personal mobile wireless device;
   in response to a user sending the entered message, holding the entered message back from being sent from the personal mobile wireless device and over a communication network for a predetermined period of time that permits the user to recall or delete the message before it is transmitted over the communication network; and implementing a curfew setting, wherein the curfew setting comprises a locator in which the locator alerts the mobile software application so as to send a notification to turn on the curfew settings if the locator notices that the user has spent longer than a predetermined amount of time in a location, wherein the locator receives location information from a GPS or other sources.

12. The non-transitory computer readable medium of claim 11, wherein the process further comprising displaying the message in a window to the user as if it has been sent but with designation to show it is being held back.

13. The non-transitory computer readable medium of claim 11, wherein the application is installed by the user and the installation makes the interactive mobile software application the default application for messaging and replying an existing SMS/MMS messaging application.

14. A system for message communication management of personal mobile wireless devices comprising:
 a mobile software application on a personal mobile wireless device, wherein the application comprising integrated contacts comprising contacts gathered from different chat platforms, a predetermined amount of time set by a user of the personal mobile wireless device to delay a message sent on the mobile software application and to delete or recall the sent message during the predetermined amount of time, and another predetermined amount of time set by the user to delay the sent message and to confirm delivery of the sent message to a recipient after the another predetermined amount of time expires,
 wherein the mobile application comprises a locator in which the locator alerts the mobile software application so as to send a notification to turn on the curfew settings if the locator notices that the user has spent longer than a predetermined amount of time in a location, wherein the locator receives location information from a GPS or other sources.

15. The system of claim 14, wherein the mobile software application is particularly implemented so as to manage SMS and MMS messaging on the mobile wireless device.

16. The system of claim 14, wherein the mobile software application is an application that is installed by the user and the installation makes the interactive mobile software application the default application for messaging and replying an existing SMS/MMS messaging application.

17. The system of claim 14, wherein the mobile software application holds the message in a buffer before sending.

18. The system of 14, wherein the mobile software application displays the message in a window to the user as if it has been sent but with designation to show it is being held back.

\* \* \* \* \*